(12) United States Patent
Brandwine (10) Patent No.: US 9,331,915 B1
(45) Date of Patent: May 3, 2016

(54) DYNAMIC NETWORK TRAFFIC MIRRORING

(71) Applicant: Amazon Technologies, Inc., Reno, NV (US)

(72) Inventor: Eric Jason Brandwine, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 477 days.

(21) Appl. No.: 13/750,207

(22) Filed: Jan. 25, 2013

(51) Int. Cl.
*G06F 15/177* (2006.01)
*H04L 12/26* (2006.01)

(52) U.S. Cl.
CPC ..................... *H04L 43/04* (2013.01)

(58) Field of Classification Search
CPC ..... H04L 43/02; H04L 43/022; H04L 43/024; H04L 43/026; H04L 43/028
USPC ......................... 709/220, 223–225
See application file for complete search history.

(56) References Cited

U.S. PATENT DOCUMENTS

| | | | | |
|---|---|---|---|---|
| 6,137,782 A * | 10/2000 | Sharon | ..................... | H04L 41/22 370/244 |
| 6,606,301 B1 * | 8/2003 | Muller | ..................... | H04L 47/10 370/230 |
| 7,493,659 B1 * | 2/2009 | Wu | ..................... | H04L 63/1416 726/26 |
| 2003/0031462 A1 * | 2/2003 | Katsuno | ................ | H04L 43/028 386/239 |
| 2003/0061305 A1 * | 3/2003 | Copley | .............. | H04L 29/06027 709/217 |
| 2006/0156389 A1 * | 7/2006 | Brown | .................. | G06F 21/552 726/244 |
| 2007/0294378 A1 * | 12/2007 | Olgaard | .................. | H04L 41/14 709/223 |
| 2010/0050256 A1 * | 2/2010 | Knapp | ................ | H04L 63/1425 726/22 |
| 2011/0082921 A1 * | 4/2011 | Breslin | ................... | H04L 12/26 709/221 |
| 2013/0094515 A1 * | 4/2013 | Gura | ...................... | H04L 47/00 370/419 |
| 2013/0139263 A1 * | 5/2013 | Beyah | ................. | H04L 63/1408 726/23 |

* cited by examiner

*Primary Examiner* — Duyen Doan
(74) *Attorney, Agent, or Firm* — Kilpatrick Townsend & Stockton LLP (57) ABSTRACT

Data packets may be mirrored or replicated to network ports and/or listening stations. Additionally, the data packets may include characteristics. Based at least in part on the characteristics of the data packets, dynamic capture lengths may be determined. A portion of the data packets may be transmitted to the network ports and/or listening station based at least in part on determined capture lengths.

24 Claims, 7 Drawing Sheets

```
                    ┌─────────────────────────────┐
                    │  RECEIVE DATA PACKETS ADDRESSED TO │
                    │     NETWORK ADDRESSES 502   │
                    └──────────────┬──────────────┘
                                   │
                                   ▼
                    ┌─────────────────────────────┐
                    │ PROVIDE DATA PACKETS TO RESPECTIVE COMPUTING │
                    │ DEVICES IDENTIFIED BY NETWORK ADDRESSES 504  │
                    └──────────────┬──────────────┘
                                   │
                                   ▼
                    ┌─────────────────────────────┐
                    │ PROVIDE CHARACTERISTIC-DETERMINED AMOUNT OF  │
                    │ DATA PACKET TO ANOTHER COMPUTING DEVICE 506  │
                    └─────────────────────────────┘
```

DYNAMIC NETWORK TRAFFIC MIRRORING

BACKGROUND

Distributed computing systems as well as distributed computing services have become widely available in recent years. In some cases, such services and/or systems may route or otherwise transmit large amounts of data for one or more computing devices associated with the services. These services may include one or more computing devices configured to act as machine instances (e.g., virtual computer systems) and/or storage resources (e.g., virtual disk drives), for example. During the management of such services, clients or users may choose to monitor network traffic associated with the transmission of the distributed data. Additionally, a computing system, user, or other entity may choose to observe or otherwise monitor network traffic within one or more environments, as desired. However, monitoring a large volume of network traffic may pose challenges to computing systems, service providers, clients, and/or users.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, managing network mirroring in a dynamic and/or configurable way. Additionally, the present disclosure may also be directed to determining an appropriate capture length for network data packets and duplicating portions of the data packets based at least in part on the determined capture length. In some examples, a service provider that offers distributed computing resources (e.g., a cloud-based service provider, a Software-as-a-Service (SaaS) provider, etc.) may allow a customer's network resources to be mirrored, monitored, or otherwise captured for analysis or other processing, as desired. In other words, a customer may request that network traffic associated with one or more of their distributed resources be provided (i.e., mirrored) to a monitoring station or other data capture device. As such, data packets that are received by the service provider may be routed to appropriate destination addresses (e.g., as indicated by the packet itself) and/or provided to an appropriate mirroring port for subsequent capture. However, in some examples, not all of each data packet may be mirrored. For example, a different sized portion of each data packet may be provided to the mirroring port to be captured. In some examples, the size of the portion may be determined based at least in part on characteristics identified in the network traffic and/or in the data packet itself.

Thus, in some examples, a client or customer may provide one or more network addresses (e.g., in a set, a list, a range, or other grouping) that identify computing resources of the client, customer, or of an account or private network associated with the client or customer. In some aspects, the client or customer may wish to have network traffic associated with these network addresses mirrored, monitored, and/or captured. For example, the service provider may be configured to mirror at least a portion of each data packet transmitted from or provided to each network address of the client or customer. As used herein, a network address may include any address that may identify a computing resource accessible via a network (e.g., the Internet, a virtual private network, etc.), may indicate a location of any such device including, but not limited to, Internet Protocol (IP) addresses or the like, and/or may indicate an address not yet assigned to a computing resource. As such, in some instances, network traffic within a range of addresses may be monitored, although some of the addresses may not yet identify computing resources. Additionally, in some examples, the amount or size of the portion of the packet to be mirrored may be dynamically determined (e.g., a different amount or size for each packet) and only that amount or size may be provided to the monitoring station. In some examples, the determination may be performed in real-time and/or after a triggering event has occurred (or, at least after an indication of the occurrence of the triggering event has been received).

In some examples, web service users or, in general, clients may utilize or otherwise control a processing entity of the service provider to control, access, or otherwise manage other computing resources. As such, data associated with the processing entity and/or the computing resources of the service provider may be transmitted to or received from computing resources of a client's private network (or other local network) via one or more network connections. As used herein, a processing entity may be a computing resource of the service provider and may include one or more computing devices, such as instantiated virtual machine instances, configured to access data of the distributed computing system (e.g., provided by the distributed system and acting on behalf of a client or user of the system). In some aspects, the service provider may also provide storage, access, and/or placement of one or more computing resources through a service such as, but not limited to, a web service, a cloud computing service, or other network based data management service. For example, a user or processing entity acting on behalf of the user may access, via the service provider, data storage services and/or data management services such that access mechanisms may be implemented and/or provided by the service provider to the processing entity utilizing the computing resources. In some examples, computing resource services, such as those provided by the service provider, may include one or more computing resources accessible across one or more networks through user interfaces (UIs), application programming interfaces (APIs), and/or other interfaces where the one or more computing resources may be scalable and/or expandable as desired In some examples, the computing resources may be server computer systems and/or data storage computer systems in a distributed computing environment, although other computing resources are considered as being within the scope of the present disclosure, some examples of which are provided below. Additionally, embodiments of the present disclosure may also be directed to, among other things, mirroring or otherwise capturing data packets associated with the operation and/or other aspects of the resources described herein, as well as managing dynamic data packet capture length determinations. Once determined, the capture length may be utilized to route appropriate amounts of data packets to appropriate computing devices. For example, a determination may be made to store only a header of a particular data packet. The service provider may then mirror or otherwise provide the header of the data packet to an appropriate network port and/or to a listening station or other monitoring device connected to that network port.

Figure 1:
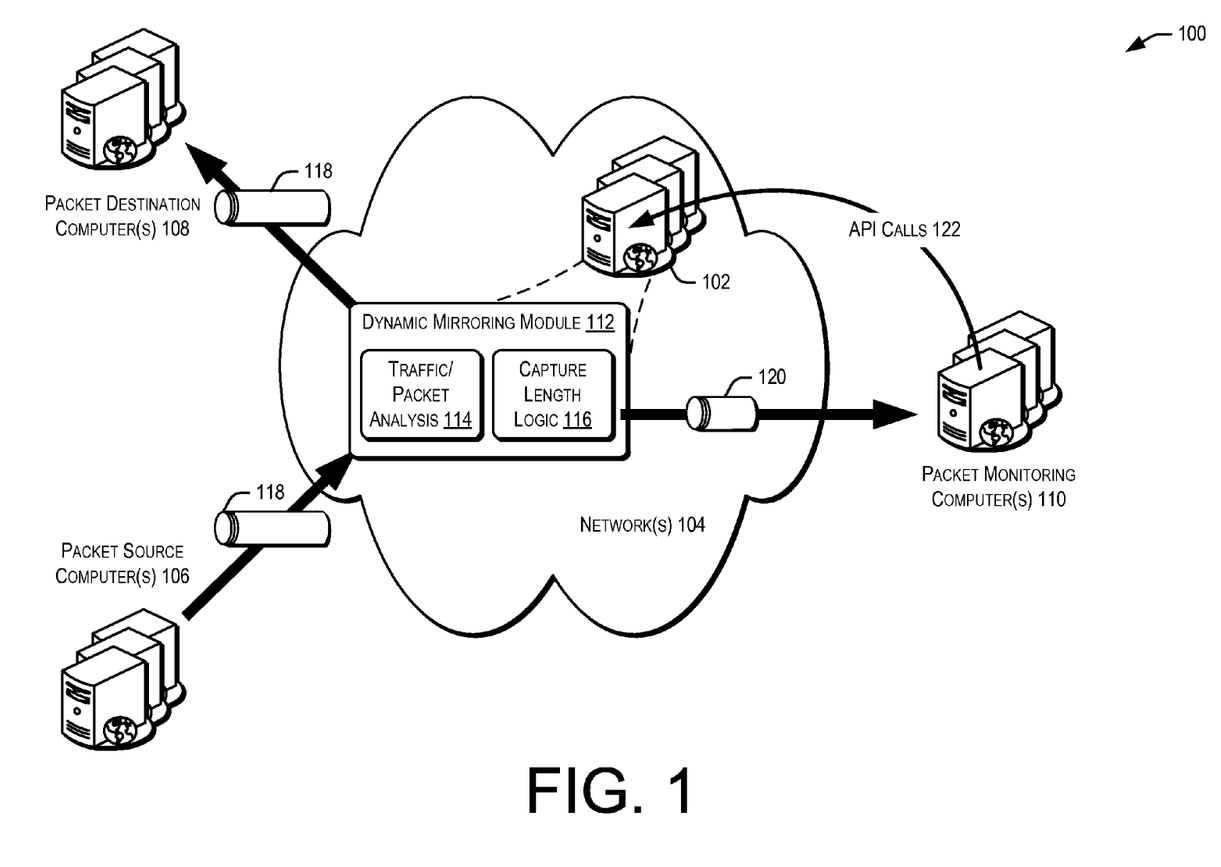
FIG. 1 illustrates an example block diagram of devices configured for implementing the dynamic network mirroring described herein, according to at least one example.

FIG. 1 depicts an illustrative architecture 100 in which techniques for the dynamic network mirroring discussed herein may be implemented. These techniques are described in more detail below in connection with at least FIGS. 2-7. Returning to FIG. 1, the illustrative architecture 100 includes one or more service provider computers 102 accessible by one or more other distributed computing resources over one or more networks 104. By way of example only, the other distributed computing resources may include client instances (e.g., virtual computing devices), data centers, web servers, or the like. At least three examples of such computing resources may include one or more packet source computers 106, one or more packet destination computers 108, and/or one or more packet monitoring computers 110 (also referred to as monitoring stations or listening stations). In some examples, a hypervisor may be utilized such that each (or any subset) of the distributed computing resources 102, 106, 108, 110 may be managed from a single computing device (or a set of interconnected computing devices). For example, the service provider computers 102 and the packet source computers 106 may be hosted by the same computing device.

In some examples, the networks 104 may include any one or a combination of many different types of networks, such as cable networks, the Internet, wireless networks, cellular networks, and other private and/or public networks. While the illustrated example represents some of the distributed computing resources 106, 108, 110 accessing the service provider computers 102 over the networks 104, the described techniques may equally apply in instances where these distributed computing resources 106, 108, 110 interact with the service provider computers 102 wirelessly, using fiber optics, Fibre Channel, or any other connection type, or in any other manner. It is also noted that the described techniques may apply in other client/server arrangements (e.g., set-top boxes, etc.), as well as in non-client/server arrangements (e.g., locally stored applications, etc.).

In some aspects, the service provider computers 102 may be any type of computing devices such as, but not limited to, mobile, desktop, thin-client, virtual, and/or cloud computing devices. In some examples, the service provider computers 102 may be in communication with the distributed computing resources 106, 108, 110 as noted above via the networks 104, or via other network connections. The service provider computers 102 may include one or more computing resources, perhaps arranged in a cluster, as a server farm, as individual servers not associated with one another, or not as servers at all (e.g., as virtual processors). These resources may be configured to perform the dynamic network mirroring as part of an integrated, distributed computing environment. Additionally, the service provider computers may include (e.g., stored in memory and executable by one or more processors) a dynamic mirroring module 112 configured to implement features of the dynamic network mirroring described herein.

More specifically, in some examples, the dynamic mirroring module 112 may be configured with a traffic/packet analysis module 114 and/or a capture length logic module 116. The traffic/packet analysis module 114 may be configured to analyze network traffic at one or more network ports of the service provider computers 102. For example, one or more ports may be utilized by the service provider computers 102 for incoming and outgoing data packets, and the traffic/packet analysis module 114 may listen to these ports. Alternatively, or in addition, the traffic/packet analysis module 114 of the dynamic mirroring module 112 may actually receive the incoming data packets and provide the outgoing data packets (e.g., at its own ports). Additionally, the traffic/packet analysis module 114 may analyze the network traffic to determine characteristics of the network traffic. For example, network traffic characteristics may include, but are not limited to, associated network addresses (e.g., source and/or destination IP addresses), port numbers, associated protocols, logged-in user names or credentials, bandwidth quotas, traffic rates, etc. Further, the traffic/packet analysis module 114 may analyze individual packets of the network traffic to identify packet characteristics. For example, packet characteristics may include, but are not limited to, packet size, source and/or destination IP addresses, the packet content, source and/or destination ports, users associated with the packet, accounts associated with the packet, etc.

In some aspects, the dynamic mirroring module 112 may also include the capture length logic module 116. The capture length logic module 116 may be configured to determine a capture length for each incoming packet (e.g., in real time) based at least in part on the traffic and/or packet characteristics identified by the traffic/packet analysis module 114. For example, the capture length logic module 116 may be configured to determine and/or assign a capture length to a data packet based at least in part on these identified characteristics, and then send a portion of the data packet (the size of which may be defined by the assigned or determined capture length) to another port or computing device (e.g., a monitoring station). In one non-limiting example, a data packet 118 may be received by the service provider computers 102 from one or more packet source computers 106. The destination address of the data packet 118 may indicate that the data packet 118 is intended to be provided to a packet destination computer 108. As such, the service provider computers 102 may provide the data packet 118 to the appropriate packet destination computer 108. However, before providing the packet 118 to its intended destination (or after storing a cached or other temporary copy of the data packet 118), the traffic/packet analysis module 114 may analyze the data packet 118 to determine characteristics of the data packet 118. In one non-limiting example, the data packet 118 may be a transmission control protocol (TCP) packet. Among other characteristics of the data packet 118, the traffic/packet analysis module 114 may identify TCP as a characteristic. As such, the dynamic mirroring module 112 may then implement the capture length logic module 116 to determine an appropriate capture length corresponding to this characteristic. This information may be stored in a look-up table or other data structure for determining capture lengths based at least in part on characteristic. The capture length logic module 116 may, in some examples, determine that the capture length for this data packet 118 (a TCP packet in this example) is the header length (e.g., the first 40 bytes). As such, only the header (i.e., the first 40 bytes) of the data packet 118 will be provided to the packet monitoring computers 110 in this example, represented by the smaller data packet 120. While 40 bytes is used in this example to describe including the header of a data packet, any number of bytes or bits may be used or assigned as a capture length, as desired.

Further, in some examples, the packet monitoring computers 110 may be configured to perform one or more API calls 122 to an API endpoint of the service provider computers 102. In this way, based at least in part on the monitored data, changes may be made to the capture length of the data packets 118 to be monitored. In some examples, the capture length logic module 116 may be further informed or otherwise managed by the API calls 122.

Figure 2:
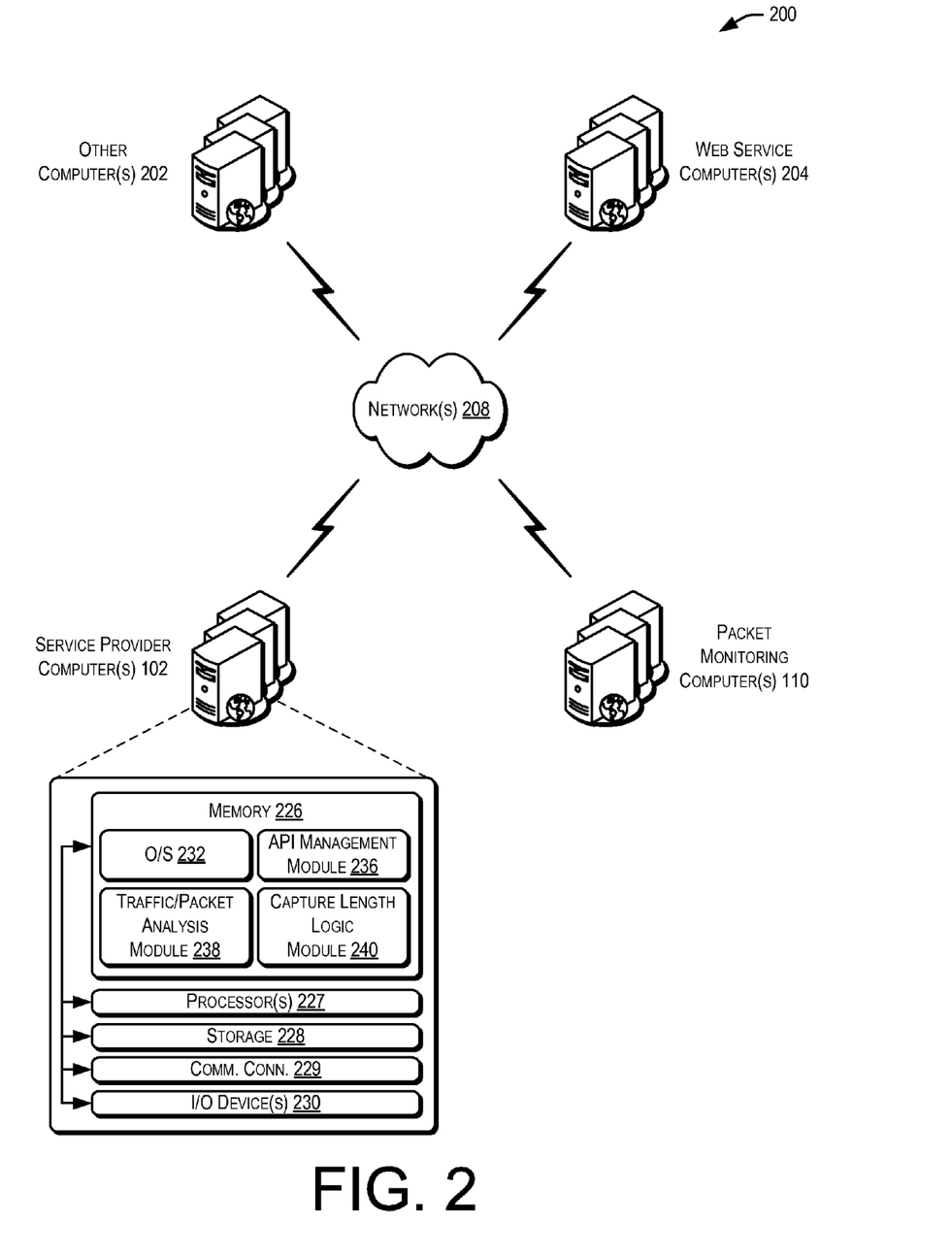
FIG. 2 illustrates an example architecture for implementing the dynamic network mirroring described herein, according to at least one example.

FIG. 2 depicts an illustrative system or architecture 200 in which techniques for the dynamic network mirroring disclosed herein may be implemented. In architecture 200, one or more service provider computers 102 (e.g., from FIG. 1) may be in communication with one or more other computers 202, web service computers 204, and/or packet monitoring computers 110 via one or more networks 208. In some aspects, the service provider computers 102, the other computers 202, the web service computers 204, and/or the packet monitoring computers 110 (referenced earlier in FIG. 1) may all be part of a distributed network of computing resources managed or otherwise controlled by a single entity (e.g., in a cloud-based service architecture) and/or hosted on a single computing device. However, in other examples, each of the computing systems 102, 202, 204, 110 may be independently managed or otherwise controlled. In some examples, the other computers 202 may be computing resources within a local and/or private network and may communicate with one another. However, in some aspects, communication between each of the other computers 202 may be routed through the service provider computers 102, as desired. For example, if any one of the other computers 202 wishes to utilize the dynamic network mirroring functionality of the service provider computers 102, the other computers 202 may subscribe or otherwise request that the service provider computers 102 dynamically mirror the network traffic passing in and/or out of any of the other computers 202.

In some examples, the web service computers 204 may be configured to provide various web services to the other computers 202 and/or the service provider computers 102. For example, the web service computers 210 may manage data storage, data processing, data monitoring, data capturing, data mirroring, or the like. That is, in some cases, each of the services provided by the service provider computers 102 may actually be implemented by the web service computers 204 on behalf of the service provider computers 102. In other words, the service provider computers 102 may be configured to implement the logic to determine what operations should be performed on the data, and they may also be configured to make API calls to the web service computers 204 to perform the operations. As such, each data operation may be implemented by one or more of the web service computers 204, at least in response to receipt of an API call from the service provider computers 102. Additionally, in some aspects, each API call (i.e., the appropriate function call information and/or parameters) may be generated and provided by the web service computers 204 to the service provider computers 102. Further, in some examples, packet monitoring computers 110 may be configured as monitoring stations. The packet monitoring computers 110 may be part of the web service computers 204 or they may be standalone computing resources configured to listen to particular mirroring ports and/or receive the mirrored data packets (e.g., a portion of each data packet with a size based at least in part on the capture length determined by the service provider computers 102).

As noted above with respect to the networks 104 of FIG. 1, the networks 208 may include any one or a combination of many different types of networks, such as cable networks, the Internet, wireless networks, cellular networks, and other private and/or public networks. While the illustrated example represents the other computers 202 (e.g., including, but not limited to, user or client computing resources) accessing the service provider computers 102 over the networks 208, the described techniques may equally apply in instances where the other computers 202 interact with the service provider computers 102 over a landline phone, via a kiosk, or in any other manner.

As noted above with reference to FIG. 1, the service provider computers 102 may be any type of computing resources such as, but not limited to, mobile, desktop, thin-client, and/or cloud computing devices, such as servers, virtual machines, or the like. In some examples, the service provider computers 102 may be in communication with the other computing resources 202, 204, 110 and/or other service providers via the networks 208, or via other network connections. The service provider computers 102 may include one or more servers, perhaps arranged in a cluster, as a server farm, or as individual servers not associated with one another. These servers may be configured to perform the verification of network address ownership as part of an integrated, distributed computing environment.

In one illustrative configuration, the service provider computers 102 may include at least one memory 226 and one or more processing units (or processor(s)) 227. The processor(s) 227 may be implemented as appropriate in hardware, computer-executable instructions, firmware, or combinations thereof. Computer-executable instruction or firmware implementations of the processor(s) 227 may include computer-executable or machine-executable instructions written in any suitable programming language to perform the various functions described.

The memory 226 may store program instructions that are loadable and executable on the processor(s) 227, as well as data generated during the execution of these programs. Depending on the configuration and type of service provider computers 102, the memory 226 may be volatile (such as RAM) and/or non-volatile (such as ROM, flash memory, etc.). The service provider computers 102 or servers may also include additional storage 228, which may include removable storage and/or non-removable storage. The additional storage 228 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 226 may include multiple different types of memory, such as SRAM, DRAM, or ROM.

The memory 226, the additional storage 228, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 226 and the additional storage 228 are all examples of computer storage media. Additional types of computer storage media that may be present in the service provider computers 102 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 102. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 102 may also contain communications connection(s) 229 that allow the service provider computers 102 to communicate with a stored database, another computing device or server, user terminals and/or other devices on the networks 208. The service provider computers 102 may also include I/O device(s) 230, such as a keyboard, a mouse, a pen, a voice input device, a touch input device, a display, speakers, a printer, etc.

Turning to the contents of the memory 226 in more detail, the memory 226 may include an operating system 232 and/or one or more application programs or services for implementing the features disclosed herein including an API management module 236, a traffic/packet analysis module 238, and/or a capture length logic module 240. In some examples, the API management module 236 may be configured to receive API call information from the one or more web service computers 204, store, organize, etc., the API call information, and/or perform appropriate API function calls as desired. For example, a web service of the web service computers 204 may be responsible for receiving incoming data packets of a customer. As part of the mirroring process, the web service may expect to receive a determined capture length from the service provider computers 102. As such, the service provider may have generated an API function call (e.g., indicating the appropriate function language, parameters, etc.). In this example, the API management module 236 may be configured to receive the API information and manage the storage of the API information. When it is determined to change the packet size to the capture length amount, the API management module 236 may perform the API call (e.g., including the capture length as a parameter) to instruct the web service to do so. Other examples, of API calls to be managed and/or performed by the API management module 236 are possible, for example, calls to received data, store data, mirror data packets, monitor data packets, etc.

As noted above, in some examples, the traffic/packet analysis module 238 may be configured to analyze incoming and/or outgoing data packets and/or network traffic associated with such data packets. The analysis may involve identifying one or more characteristics of the data packets and/or of the network traffic as a whole. Additionally, the analysis may be performed by making one or more API calls as described briefly above. For example, each piece of information from the received data packet and/or general network traffic information may be provided to one or more web services via API calls. The web service may then store, process, or otherwise manage the characteristics of the data packet and/or the network traffic information for the service provider computes 102. Additionally, in some examples, the capture length logic module 240 may be configured to determine a capture length for the amount of the data packet to be provided to the mirroring port and/or the monitoring station (e.g., the packet monitoring computers 110 or the like).

In some examples, the service provider computers 102 and/or web service computers 204 may be configured (e.g., with the use of the traffic/packet analysis module 238, the capture length logic module 240, or other similar modules) to vary the capture length in real-time based at least in part on the identified data packet characteristics. For example, only the first forty bytes of a data packet may be provided to the packet monitoring computers 110. In other examples, any number of bytes, only header information, or other amount (e.g., a percentage or other metric) may be provided. In at least one non-limiting example a first capture length amount of a first data packet may be provided, followed a different capture length amount for a second data packet. The difference in capture length amounts may be based at least in part on a characteristic of the data packets themselves or network traffic corresponding to either or both data packets.

In some aspects, state may be monitored such that additional features may be realized. In other words, decisions about how much of a packet to provide (i.e., the capture length) can be stateful. For example, in one non-limiting example, entire data packets may be provided (i.e., a capture length equal to packet length) for TCP packets that were initialized with even initialization sequence numbers. Further, the capture length may be based at least in part on something other than the packet length. Thus, in another non-limiting example, it may be that the first 1024 bytes of every hypertext transfer protocol (HTTP) stream may require assembly over multiple packets. And, if a particular cookie or other marker is identified, then the traffic/packet analysis module 238 and/or the capture length module 240 may determine to keep the whole stream. This example, may require keeping state because in order to keep the first 8 k of the stream, it may be necessary to know how far into the stream the process is (e.g., since initial sequence numbers are random, it may not be evident how far into the stream the process is based on any individual packet. Thus, once the traffic/packet analysis module 238 and/or the capture length module 240 identifies the cookie or marker, they may be able to determine (based at least in part on source IP address, the destination IP address, the source port, the destination port, and/or TCP information) to keep each entire packet.

In some examples, one or more filters may be utilized to make the capture length determination. For example, a trigger may be any indication of an event or characteristic that is being examined, is expected, or for which is otherwise being monitored. Example filters may include, but are not limited to, packet size above a certain amount, network traffic above a certain level, a number of packets or connect requests within a period of time, etc. Triggers may come from internal sources (e.g., the traffic/packet analysis module 238 or the like) or they may come from external sources (e.g., the web service computers 204, other computers 202, and/or the packet monitoring computers 110. In some aspects, the trigger may indicate a characteristic that the traffic/packet analysis module 238 is or should be looking for. The triggers may also be customer configurable and/or dynamically updatable. One non-limiting example of an internal trigger may be a number of packets or connection requests received within a time period. In this example, it may be indicated in a table or other data storage device that a particular number of received data packets may be normal within a 5 minute period. As such, the capture length may be set at headers only (e.g., the first 40 bytes or some other length less than all the packet length) until the trigger point is reached (i.e., until more than that particular number of data packets is received within any given 5 minute period). Of course, other characteristics, such as but not limited to, packet length, connection requests, IP address, etc., may define trigger points, as desired. Further, one non-limiting example of an external trigger may be a source IP address or the like. In this example, it may be indicated that traffic from one or more known other computers 202 may be normal. As such, the capture length may be set low until the trigger point is reached (i.e., until traffic is identified from an unknown IP address or from a computing device outside of the other computers 202. At that point, the service provider computers 102 may decide to capture all of each packet coming from that IP address, as desired.

In at least one example, providing data to the packet monitoring computers 110 utilizing a capture length less than the entire packet length may aid in lowering the traffic volume of mirrored data. However, not all of the data is being replicated in this scenario. As such, when a certain set of data packets is determined to be "of interest" and/or at risk for security purposes, the service provider computers 102 may decide to begin mirroring more of each data packet than the "less than the entire packet" amount being mirrored to lower volume. As such, the capture length logic module 240 may be configured to increase capture length for incoming data packets to full packet length or some other amount of the data packet that is at least greater than the headers or the "less than entire packet" amount described above. In some examples, the capture length may be automatically increased whenever a trigger is identified and/or reached. Additionally, in some examples, once a trigger is identified, the capture length logic module 240 may introduce one or more filters to further determine whether a capture length change is appropriate and, if so, what the updated capture length is to be. For example, an off-board database may indicate that a particular computing device (e.g., one of the other computers 202) is a web server. As such, the traffic/packet analysis module 238 may know what to expect from data packets coming and/or going from that computing device. Even if a trigger is reached (e.g., number of data packets sent during a period of time), the filter may not indicate to increase the capture length unless the data packets are something that would not be expected from a web server.

Additionally, in some examples, the filters may include source and/or destination ports. For example, the filtering logic may indicate that data packets coming in at particular ports and/or being routed out on particular ports (based at least in part on instruction from the data packets themselves) are safe. As such, only a portion of the data packet may be mirrored to save bandwidth or traffic volume. However, for data packets that are not coming in and/or out of ports that are expected (e.g., in on port 80 or 443, or out on port 80), the capture length may be increase to full packet length or at least something greater than what was already be being mirrored. In some examples, filters may be utilized to determine whether network traffic appears innocuous. If a triggering event is identified, the traffic/packet analysis module 238 may analyze the traffic to determine whether it is innocuous or not. If it turns out to be innocuous, the trigger (or triggering even) may be added to a "black list" or other list for indicating triggers that don't actually indicate issues to be monitored. Further, in some examples, the traffic/packet analysis module 238 may identify that a particular computing device is communicating with another particular device. If it is determined (or listed in a table) that these two particular computing devices should not be communicating with one another, monitoring may be increased on either or both of those two particular devices (i.e., the capture length may be increased for packets between those two devices).

One or more packet monitoring computers 110 may, in some cases, request help from one or more additional monitoring computers 110. In other words, if it is determined that too many data packets (or too much of each data packet) are being provided to a single (or group of) packet monitoring computers 110, auto-scaling may be employed to instantiate or connect additional listening stations. In one non-limiting example, an API or in-cloud device may be used to implement the listening station. However, too much mirrored traffic may overwhelm the listening station. As such, traffic levels, computing devices being monitored, and/or types of data packet captures (e.g., based at least in part on capture length size or packet length) may be monitored by the traffic/packet analysis module 238 to determine when additional listening stations may be helpful. API calls may be employed in order to launch and/or connect such additional listening stations. Alternatively, or in addition, if a packet monitoring computer's 110 full capacity is being approached, additional listening stations can be employed. Further, in some examples, the mirrored data packets (or portions of data packets) may be distributed to multiple different packet monitoring computers 110, as desired. In some cases, a customer, client, or user may control or otherwise manage the packet monitoring computers 110 or other listening stations.

In some aspects, the service provider computers 102 may act (or otherwise offer their services) as a service to customers. In this example, a customer may purchase or lease the software for operating the features described herein. However, in other examples, the customer may delegate rights to their computing devices and/or network resources, such that the service provider computers 102 may have credentials or otherwise assume a role within the customer's system. As such, in this example, the service provider computers 102 may configure the customer's network monitoring such that the customer's network traffic is routed to the service provider computers 102. The service provider computers 102 may then process the incoming and/or outgoing data packets, provide reporting, provide alarming, provide UIs, and/or perform API calls on behalf of the customer. The API calls may be utilized to change what packets are replicated, to where it's replicated, and/or how much of each packet is replicated.

Additionally, as noted above, different filters may be utilized to determine different capture lengths and/or how much of each data packet should be captured by the listening stations (e.g., the packet monitoring computers 110), in some examples. For example, the filter may include a form of protocol analysis, whereby if the traffic/packet analysis module 238 identifies data packets going over an HTTP port that aren't actually HTTP packets, the capture length may be increased such that more of each such packet is being recorded or at least monitored. Alternatively, or in addition, the filter may express a length of a session to capture or a particular session to capture based at least in part on criterion that isn't in every packet and/or statefully remembering an amount of data to capture. Further, in some cases, an external (or internal) signal may indicate that a particular computing device or host is under attack. In this scenario, the service provider computers 102 may begin mirroring entire data packets associated with the potential attack. However, in other examples, the service provider computers 102 may first identify users that have successfully authenticated and stop mirroring their traffic. In other words, to minimize mirroring traffic, only computing devices or users that have not been authenticated may be mirrored, monitored, or otherwise have capture lengths set to larger amounts.

In some examples, the features described herein may be source based, while in others, it may be farmed out to a network computer 202 or web service computer 204. In a non-limiting source based example, a guest or customer may send packets that may be intercepted by the domain zero (hereinafter, "dom0") of the service provider computers 102. Based at least in part on configurable metadata in the dom0, the service provider computers 102 may determine and/or send two copies of the data packets being replicated (rather than one), one copy to the original destination and one copy to the packet monitoring computers 110 or other listening stations. In some cases, this may be performed by the dom0 of a host where the data packets are received or somewhere in the network (e.g., at a network switch, router, etc.). Alternatively, in other examples, a subset of interesting data packets may be forwarded to an interpretation station or other computing device external to the dom0. The traffic may be unpacked at the interpretation station, where fine grain filters (at least finer than those that determined which traffic to send to the interpretation station) may be utilized to determine whether or not to mirror the respective data packets and, if so, an appropriate capture length for each data packet. A first copy of the data may be provided to the original destination address, while a second copy may be provided to the packet monitoring computers 110 or other listening stations. In this scenario, the dom0 filter may be much simpler, and the service provider computers 102 and/or dom0 may only need to send a single copy of the data packet (i.e., to the interpretation station).

Additionally, in some examples, the packet monitoring computers 110 may be configured to perform one or more API calls to an endpoint of the web service computers 204 and/or the service provider computers 102. As such, the capture length logic module 240 may be further informed about capture length determinations based at least in part on the configuration of the service provider computers 102 via these API calls. In other words, the API calls may, in some examples, configure the capture length logic module 240.

A few additional examples of the operations of the service provider computers 102 are also described in greater detail below with reference to FIGS. 3-7.

Figure 3:
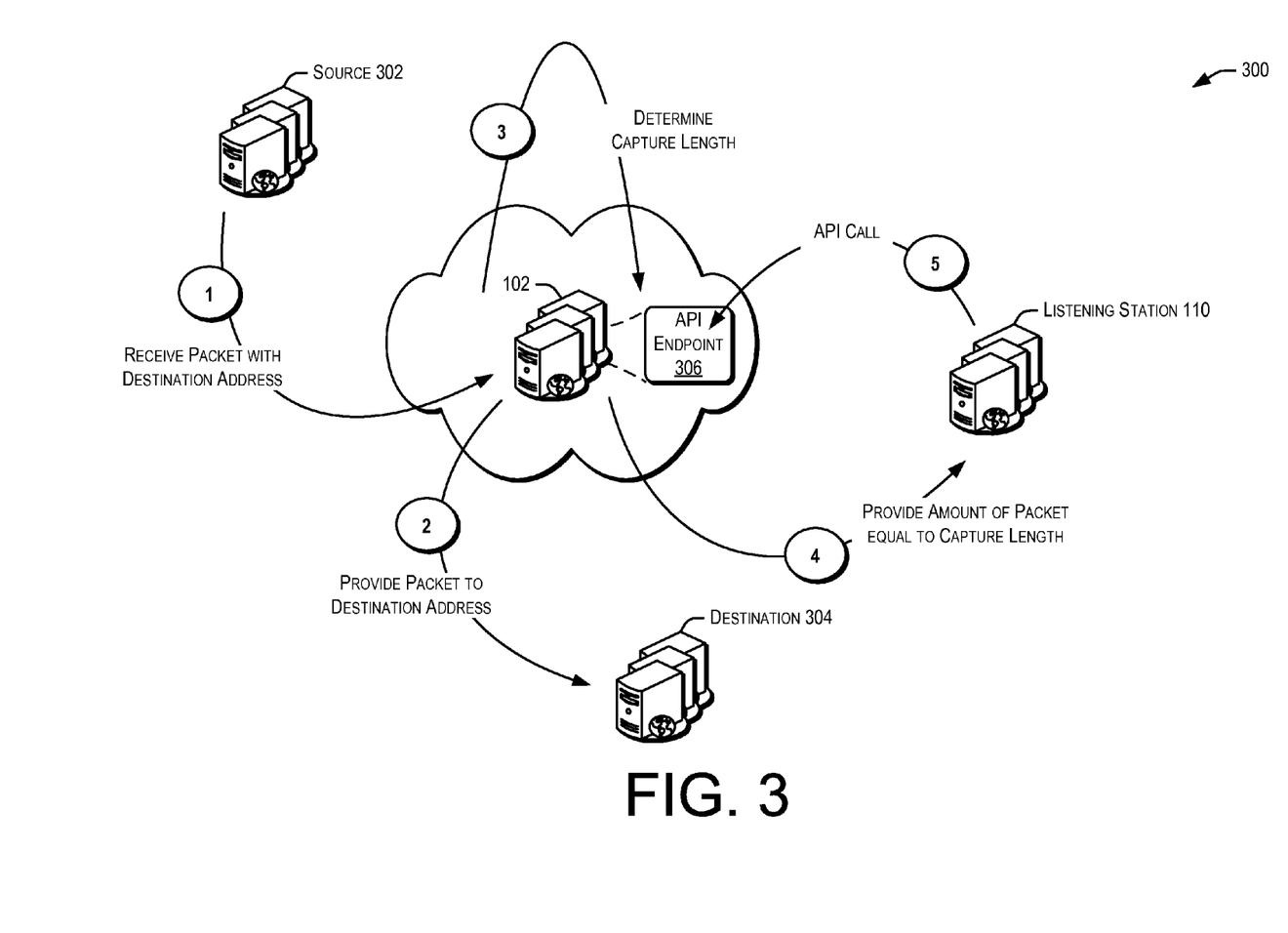
FIG. 3 illustrates an example flow of some additional features of the dynamic network mirroring described herein, according to at least one example.

FIG. 3 illustrates another example flow diagram showing one or more techniques 300 for dynamic network mirroring, as described herein. While techniques 300 are shown in FIG. 3 in a particular order (including arbitrary sequence numbers), it should be understood that no particular order is necessary and that one or more steps or parts of the techniques 300 may be omitted, skipped, and/or reordered. In at least one non-limiting example, the one or more service provider computers 102 described above with respect to FIGS. 1 and 2 may receive data packets from a source 302 that may be addressed to network addresses. The service provider computers 102 may provide these data packets to the appropriate destination 304 (based at least in part on the network address identified by the packet) in some examples. However, in other examples, a course filter may be provided to determine which packets to forward to the destination 304 and which packets to forward to an interpretation station that utilizes finer filters. In some cases, the service provider computers 102 may also determine a capture length. The capture length may be determined based at least in part on characteristic of the data packet itself or of the associated network traffic as a whole (or over an interval of time). The capture length may be determined before the packets are sent and/or received, or the capture length may be determined at capture time (e.g., at and/or by the listening station). Based at least in part on the determined capture length, a portion of the data packet may then be provided to a listening station 110 (also referred to herein as packet monitoring computers 110). The size of the portion may be based at least in part on (or equal to) the determined capture length. Additionally, in some aspects, the listening station 110 may be configured to make API calls to an API endpoint 306. The API endpoint 306 may be utilized to configure the service provider computers 102 for determining different capture lengths. For example, changes in the capture length of data packets to be sent to the listening station 110 may be influenced or otherwise controlled by the API calls of the listening station.

Figure 4:
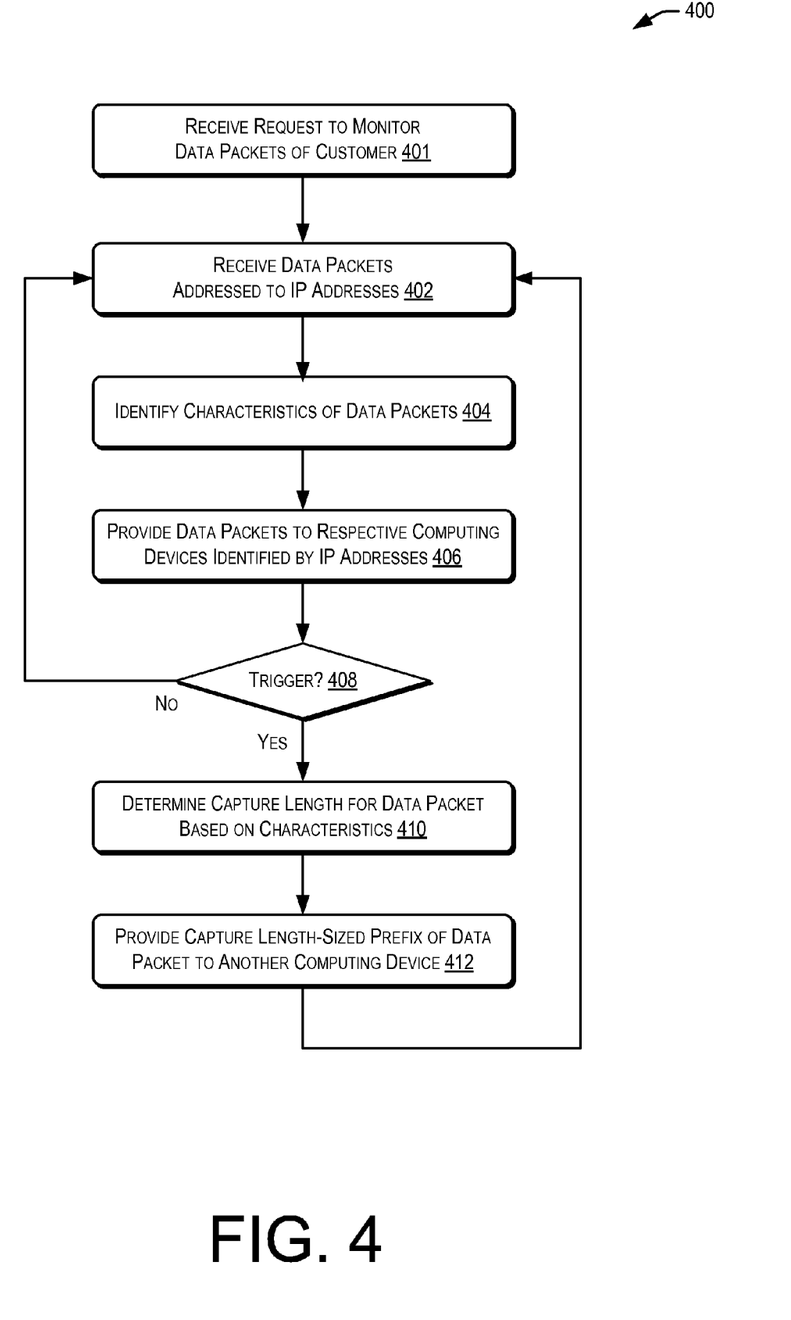
FIG. 4 illustrates an example flow diagram of a process for implementing the dynamic network mirroring described herein, according to at least one example.
Figure 5:
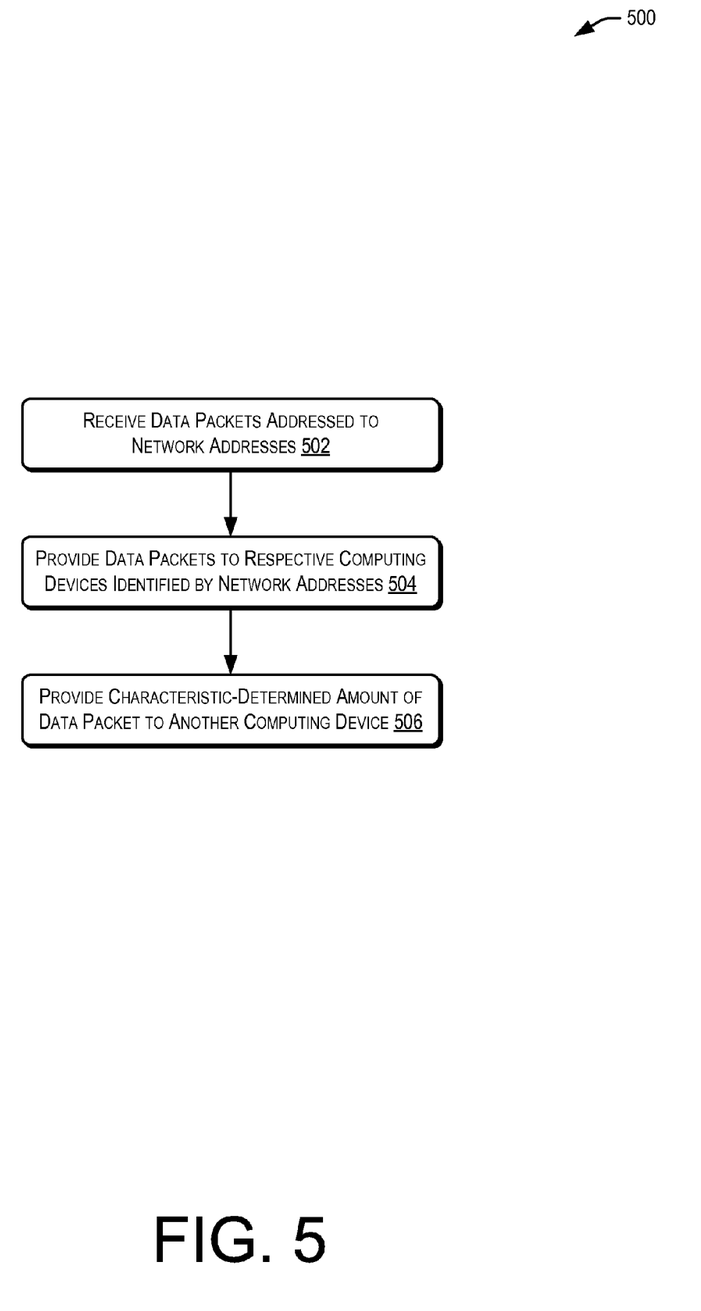
FIG. 5 illustrates an example flow diagram of a process for implementing the dynamic network mirroring described herein, according to at least one example.
Figure 6:
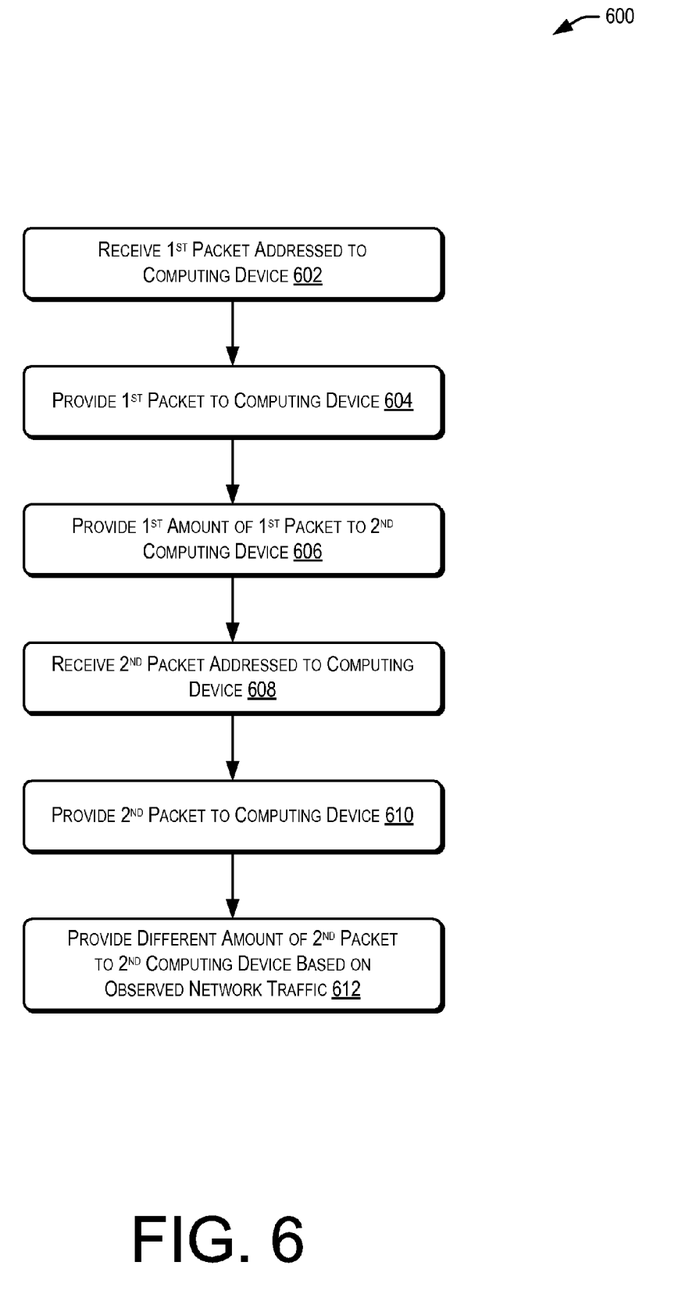
FIG. 6 illustrates an example flow diagram of a process for implementing the dynamic network mirroring described herein, according to at least one example.

FIGS. 4-6 illustrate example flow diagrams showing respective processes 400-600 for implementing dynamic network mirroring. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 102 (e.g., utilizing at least one of the traffic/packet analysis module 238 and/or the capture length logic module 240) shown in FIG. 2 may perform the process 400 of FIG. 4. The process 400 may begin by including receipt of a request from a customer to monitor data packets of the customer at 401. At 402, the process 400 may include receiving data packets addressed to IP addresses of the customer. The IP addresses may identify computing devices of the service provider computers 102 of FIGS. 1-3 or external users or devices of the customer. Once the data packets are received, the process 400 may include identifying characteristics of the received data packets at 404. As noted above, characteristics of the data packets may include information that be found within the data packet including, but not limited to, source IP address, destination IP address, source port, destination port, protocol type, etc. At 406, the process 400 may include providing data packets to respective computing devices identified by the IP addressed to which the received data packets were addressed. In other words, the data packets may be provided to their intended destinations. Additionally, at 408, the process 400 may include determining whether a triggering event has occurred.

In some cases, if the triggering event has not occurred at 408, the process 400 may include returning to 402 to receive the next data packet(s). However, if the triggering event has occurred at 408, the process 400 may include determining a capture length for the data packet based at least in part on the identified characteristics at 410. In some cases, this determination may also be based at least in part on the filters discussed above. At 412, the process 400 may terminate by including providing a capture length-sized prefix (i.e., a portion including at least the first byte of the data pack and each subsequent byte to the end of the portion) of the data packet to another computing device different than the computing device associated with the IP address. Additionally, determining the capture length and/or providing the capture length-sized data packets may be configured based at least in part on a received API call. In other words, a prefix of the data packet may be provided to the other computing device, and the size of the portion may be based at least in part on the determined capture length and/or information included in the API call. The other computing device may be configured as a listening station or other monitoring device. Alternatively, the process 400 may return to 402 to receive the next data packet after the previous data packet has been provided to the computing device. Additionally, the prefix may include any sequence of bytes that may not necessarily begin at the beginning of the packet (e.g., bytes M through N, where M and N are positive integers with M less than N).

FIG. 5 illustrates an example flow diagram showing process 500 for implementing dynamic network mirroring. The one or more service provider computers 102 (e.g., utilizing at least one of the traffic/packet analysis module 238 and/or the capture length logic module 240) shown in FIG. 2 may perform the process 500 of FIG. 5. The process 500 may begin by receiving a data packet addressed to a network address at 502. The network address may be an IP address or some other identifier that can be used to route the data packet to its intended destination. At 504, the process 500 may include providing the data packets to respective computing devices identified by the network addresses of the data packet. In other words, the data packet may be forwarded to the intended destination. At 506, the process 500 may end by including providing a characteristic-determined amount of the data packet to another computing device. The other computing device may, in some examples, be a monitoring station such as, but not limited to, one or more of the packet monitoring computers 110 of FIG. 2. The monitoring station may then capture the data packet or at least a portion of the data packet.

FIG. 6 illustrates an example flow diagram showing process 600 for verifying network addresses. The one or more service provider computers 102 (e.g., utilizing at least one of the traffic/packet analysis module 238 and/or the capture length logic module 240) shown in FIG. 2 may perform the process 600 of FIG. 6. The process 600 may begin by including receiving a first data packet addressed to a computing device at 602. At 604, the process may include providing the first data packet to the computing device. The process 600 may also provide a first amount of the first data packet to a second computing device (e.g., a listening station) at 606. At 608, the process 600 may include receiving a second data packet addressed to the same computer as the first data packet. The process 600 may also provide the second data packet to the destination computing device at 610. Further, at 612, the process 600 may end by providing a different amount of the second packet (e.g., different than the first amount) to the listening station. The different amount may be based at least in part on observed network traffic.

Illustrative methods and systems for implementing dynamic network mirroring are described above. Some or all of these systems and methods may, but need not, be implemented at least partially by architectures such as those shown at least in FIGS. 1-6 above.

Figure 7:
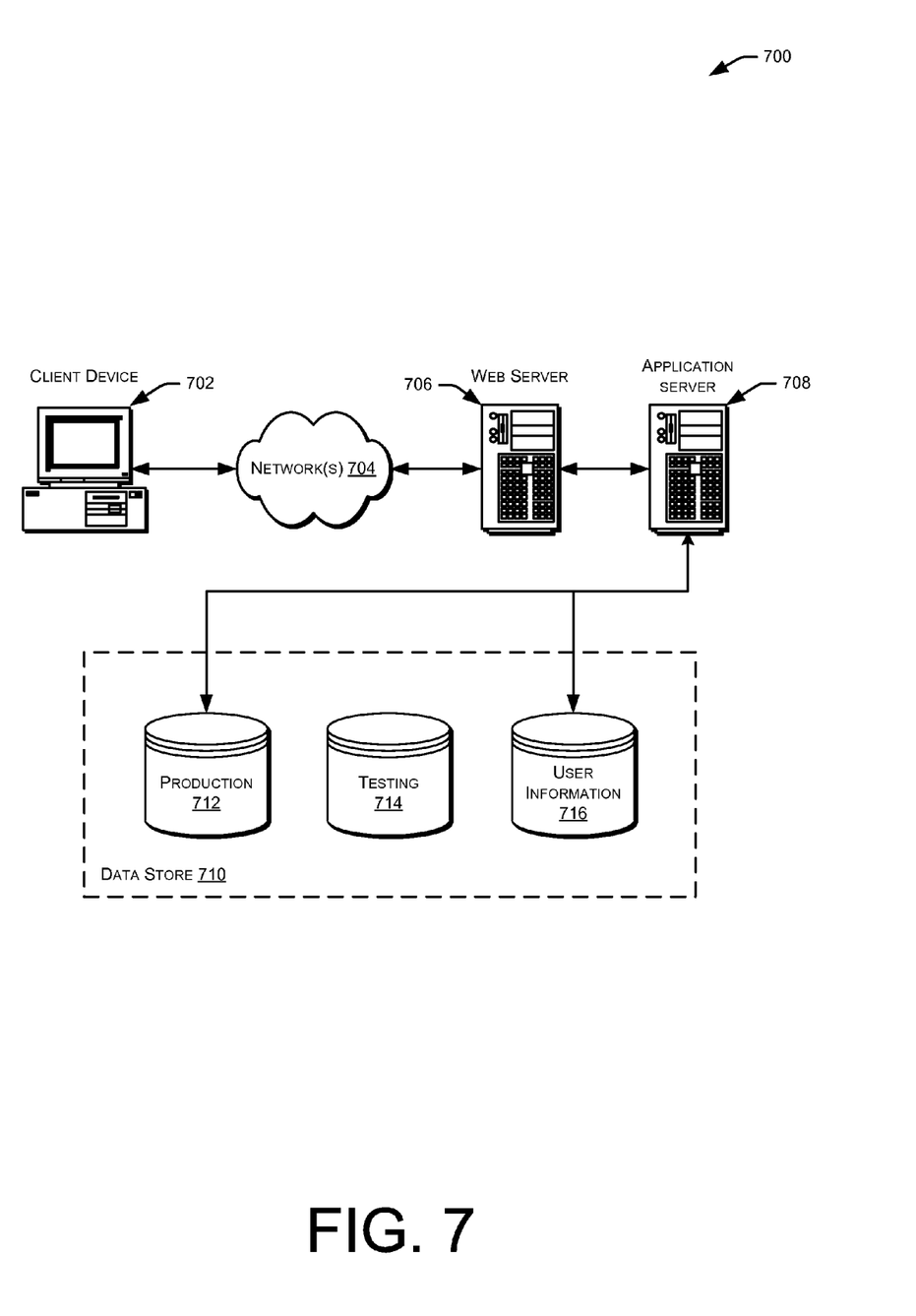
FIG. 7 illustrates an environment in which various embodiments of the dynamic network mirroring described herein can be implemented, according to at least one example.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for managing network traffic mirroring, comprising:

receiving, by one or more computer systems, a request from a customer to monitor at least an amount of data packets associated with the customer;

receiving, by the one or more computer systems, the data packets addressed to Internet Protocol addresses of the customer;

identifying, by the one or more computer systems, characteristics of the data packets, the characteristics of the data packets including at least one of a content type of the data packets, a size of the data packets, a marker in the data packets, a user associated with the data packets, or a sequence of bytes included in at least one of the data packets;

providing, by the one or more computer systems, the data packets to respective computing devices identified by the Internet Protocol addresses of the customer;

in response to a trigger, determining, by the one or more computer systems, a capture length for at least one packet of the data packets based at least in part on the identified characteristics of the data packets, the trigger comprising information identified by the one or more computer systems and a time threshold;

identifying, by the one or more computer systems, a portion of the at least one packet of the data packets based at least in part on the determined capture length; and providing, by the one or more computer systems, the portion of the at least one packet of the data packets to an alternative computing device other than the respective computing devices identified by the Internet Protocol addresses of the customer.

2. The computer-implemented method of claim 1, further comprising providing a second portion of at least a second packet of the data packets to the alternative computing device, the second portion being different than the portion of the at least one packet of the data packets based at least in part on the identified characteristics of the second packet of the data packets.

3. The computer-implemented method of claim 1, wherein the capture length is at least large enough to include a header of the at least one of the data packets.

4. The computer-implemented method of claim 1, wherein the identified information includes at least one of a threshold frequency of network activity being reached, an indication of a potential security breach, an indication that a level of monitoring associated with a particular computer is to be increased, or an indication that unexpected behavior associated with the received data packets has occurred.

5. A computer-implemented method for managing network traffic mirroring, comprising:

receiving, by one or more computer systems, data packets addressed to one or more network addresses;

providing the data packets to respective computing devices identified by the one or more network addresses;

identifying, by the one or more computer systems, a portion of the data packets based at least in part on a characteristic of the data packets in response to a trigger comprising information identified by the one or more computer systems and a time threshold, the characteristic including at least one of a content type of the data packets, a size of the data packets, a marker in the data packets, a user associated with the data packets, or a sequence of bytes included in at least one of the data packets; and providing at least the portion of each received data packet to another computing device.

6. The computer-implemented method of claim 5, wherein the network traffic corresponds to at least one of the received data packets or the provided data packets.

7. The computer-implemented method of claim 5, wherein the characteristic further includes information from a header of the received data packets.

8. The computer-implemented method of claim 5, wherein the characteristic further includes information identifying a behavior or device to be monitored.

9. The computer-implemented method of claim 5, wherein the respective computing devices and the other computing device correspond to a customer, and the portion of each received data packet is provided to the other computer device based at least in part on a request, by the customer, to monitor the data packets associated with the respective computing devices.

10. The computer-implemented method of claim 9, wherein the portion of each received data packet to be provided is changed based at least in part on a remotely performed application programming interface call to change the amount.

11. The computer-implemented method of claim 9, wherein the portion of each received data packet to be provided is determined based at least in part on a filter configurable by the customer.

12. A system for managing network traffic mirroring, comprising:
   at least one memory that stores computer-executable instructions; and
   at least one processor configured to access the at least one memory, wherein the at least one processor is configured to execute the computer-executable instructions to collectively at least:
      receive a packet of data addressed to a first computing device;
      provide at least an amount of the packet of data to a computing system, the amount determined based at least in part on a default level of provisioning associated with the first computing device;
      identify an updated amount for subsequent packets of data based at least in part on a trigger, the trigger comprising information identifying a number of packets of data intended for the first computing device exceeding a threshold within a time period, the updated amount for the subsequent packets utilizing an updated level of provisioning; and
      provide at least the updated amount of the subsequent packets of data to the computing system.

13. The system of claim 12, wherein the information is received from an external computing device.

14. The system of claim 13, wherein the updated amount of the subsequent packets of data to be provided is further based at least in part on a function call caused to be performed by the computing system.

15. The system of claim 12, wherein the at least one processor is further configured to execute the computer-executable instructions to collectively at least cause instantiation of at least one additional computing device of the computing system when a load on the computing system crosses the threshold, the load including at least the first packet data or the subsequent packets of data.

16. The system of claim 15, wherein the at least one processor is further configured to execute the computer-executable instructions to collectively at least replicate the updated amount of the subsequent packets of data.

17. One or more non-transitory computer-readable media storing computer-executable instructions for managing network traffic mirroring that, when executed by one or more computer systems, configure the one or more computer systems to:
   receive a first data packet addressed to a first computing device;
   provide an amount of the first data packet to a second computing device, the amount determined based at least in part on a default level of provisioning associated with the first computing device;
   receive a second data packet addressed to the first computing device;
   identify an updated amount for subsequent packets of data based at least in part on a trigger, the trigger comprising information identifying a number of data packets intended for the first computing device exceeding a threshold within a time period, the updated amount for the subsequent packets of data utilizing an updated level of provisioning; and
   provide, to the second computing device, the updated amount of the second data packet.

18. The one or more non-transitory computer-readable media of claim 17, wherein the updated amount is further based at least in part on a characteristic of at least one of the first data packet or the second data packet.

19. The one or more non-transitory computer-readable media of claim 18, wherein the characteristic is based at least in part on other information included in the first data packet or the second data packet.

20. The one or more non-transitory computer-readable media of claim 17, wherein the updated amount is determined at a time after the amount of the first data packet is provided to a network port of the second computing device.

21. The one or more non-transitory computer-readable media of claim 17, wherein the instructions further configure the one or more computer systems to determine the updated amount of the second data packet based at least in part on an order in which the first and second data packets were received.

22. The one or more non-transitory computer-readable media of claim 21, wherein the instructions further configure the one or more computer systems to identify criteria for determining at least the amount or the updated amount, wherein the criteria include a first indication that the first or second data packet is not formatted according to an expected format.

23. The one or more non-transitory computer-readable media of claim 22, wherein the criteria includes a second indication of a state of the first or second data packet.

24. The one or more non-transitory computer-readable media of claim 17, wherein the default level of provisioning comprises a header for the first data packet, and wherein the updated level of provisioning comprises an entirety of the subsequent packets of data.

* * * * *